US010435550B2

(12) United States Patent
Chou et al.

(10) Patent No.: US 10,435,550 B2
(45) Date of Patent: *Oct. 8, 2019

(54) VARIABLE VAPOR BARRIER FOR HUMIDITY CONTROL

(71) Applicant: E I DU PONT DE NEMOURS AND COMPANY, Wilmington, DE (US)

(72) Inventors: Richard T Chou, Hockessin, DE (US); Loic Pierre Rolland, Divonne les Bains (FR)

(73) Assignee: PERFORMANCE MATERIALS NA, INC., Midland, MI (US)

(*) Notice: Subject to any disclaimer, the term of this patent is extended or adjusted under 35 U.S.C. 154(b) by 605 days.

This patent is subject to a terminal disclaimer.

(21) Appl. No.: 14/575,289

(22) Filed: Dec. 18, 2014

(65) Prior Publication Data

US 2015/0175792 A1 Jun. 25, 2015

Related U.S. Application Data

(60) Provisional application No. 61/918,721, filed on Dec. 20, 2013.

(51) Int. Cl.
| B32B 27/12 | (2006.01) |
| C08L 23/08 | (2006.01) |
| B32B 5/02 | (2006.01) |
| B32B 29/02 | (2006.01) |

(52) U.S. Cl.
CPC .......... *C08L 23/0869* (2013.01); *B32B 5/022* (2013.01); *B32B 5/024* (2013.01); *B32B 29/02* (2013.01); *B32B 2260/021* (2013.01); *B32B 2260/046* (2013.01); *B32B 2262/0253* (2013.01); *B32B 2262/0276* (2013.01); *B32B 2307/304* (2013.01); *B32B 2307/7246* (2013.01); *B32B 2419/00* (2013.01); *C08L 2205/02* (2013.01); *C08L 2207/066* (2013.01); *Y10T 428/249992* (2015.04); *Y10T 428/31906* (2015.04); *Y10T 442/2139* (2015.04)

(58) Field of Classification Search
CPC ................................ B32B 27/12; B32B 27/32
USPC ...................... 442/59, 76, 394, 398; 525/225
See application file for complete search history.

(56) References Cited

U.S. PATENT DOCUMENTS

| 2,897,183 | A | | 7/1959 | Christl et al. |
| 3,350,372 | A | | 10/1967 | Anspon et al. |
| 3,756,996 | A | | 9/1973 | Pugh et al. |
| 3,972,961 | A | | 8/1976 | Hammer et al. |
| RE30,754 | E | * | 9/1981 | Hammer ................ C08G 69/00 |
| | | | | 525/379 |
| 4,351,931 | A | | 9/1982 | Armitage |
| 5,028,674 | A | | 7/1991 | Hatch et al. |
| 5,198,401 | A | | 3/1993 | Turner et al. |
| 5,405,922 | A | | 4/1995 | De Chellis et al. |
| 5,532,066 | A | | 7/1996 | Latiolais et al. |
| 6,808,772 | B2 | | 10/2004 | Kunzel et al. |
| 6,878,455 | B2 | | 4/2005 | Kunzel et al. |
| 6,890,666 | B2 | | 5/2005 | Kunzel et al. |
| 7,008,890 | B1 | | 3/2006 | Kunzel et al. |
| 7,442,659 | B2 | | 10/2008 | Moll |
| 7,829,197 | B2 | | 11/2010 | Chen et al. |
| 7,838,104 | B2 | | 11/2010 | Chen et al. |
| 7,914,634 | B2 | | 3/2011 | Moll |
| 2003/0021945 | A1 | | 1/2003 | Kelch |
| 2003/0215609 | A1 | | 11/2003 | Burkart |
| 2005/0187315 | A1 | | 8/2005 | Dean |
| 2008/0160280 | A1 | * | 7/2008 | Chen ..................... B32B 27/08 |
| | | | | 428/221 |
| 2010/0273379 | A1 | * | 10/2010 | Chen ..................... B32B 27/12 |
| | | | | 442/59 |

FOREIGN PATENT DOCUMENTS

WO 02/102898 A1 12/2002

OTHER PUBLICATIONS

Chou et al, High Flexibility EMA Made from High Pressure Tubular Process, Annual Technical Conference—Society of Plastics Engineers (2002), 60th (vol. 2), 1832-1836.

* cited by examiner

*Primary Examiner* — Matthew D Matzek

(57) ABSTRACT

Disclosed is a vapor permeable composition comprising a copolymer comprising copolymerized units of ethylene and copolymerized units of a comonomer providing an amine-reactive site; a short chain polymer having one primary amine active amine site, and comprising propylene oxide, ethylene oxide, or mixture thereof. The composition is useful as a vapor barrier for moisture control of buildings. Also disclosed are articles comprising the vapor permeable composition and methods of their use.

18 Claims, No Drawings

VARIABLE VAPOR BARRIER FOR HUMIDITY CONTROL

CROSS REFERENCE TO RELATED APPLICATION

This application claims priority under 35 U.S.C. § 119(e) from U.S. Provisional Patent Application No. 61/918,721, filed Dec. 20, 2013, hereby incorporated herein by reference in its entirety.

FIELD OF THE INVENTION

This invention relates to a composition having variable moisture permeance under different ambient humidity conditions, and articles comprising the composition.

BACKGROUND OF THE INVENTION

Confined spaces such as building interiors may have limited exchange of moisture vapor with adjacent or external environmental spaces. Materials having moisture permeance that is variable when exposed to different ambient conditions can provide benefits for construction of energy efficient buildings.

Buildings are commonly equipped with thermal insulation in order to provide comfortable living conditions inside the building. In addition to insulation, buildings are also constructed with various air barrier materials to limit air and water infiltration into the structure of the building. These air barriers minimize heat loss through draft flow.

In addition to air barriers, vapor barriers have also been used for controlling flow of moisture. For example, the moisture flow is generally from inside to outside when the exterior air is cold and dry (winter) and from outside to inside when the air is hot and humid (summer). In regions where these conditions prevail, it is common practice to use a vapor barrier such as polyethylene (PE) film on the warm side of the insulation, generally behind the gypsum wallboard, to prevent moisture diffusion from the interior heated space to the exterior cold environment. Such vapor barriers reduce the potential for moisture condensation in the interior wall cavity space as the water vapor is exposed to the cold exterior temperatures. Although the use of PE film as a vapor barrier reduces moisture condensation during exterior conditions of cold temperatures and low humidity, the same vapor barrier increases the likelihood of moisture condensation at the insulation-PE film interface during hot, humid summer conditions where moisture flow is from outside to inside. Therefore, it is desirable to have a material that acts as a vapor barrier during winter but facilitates vapor permeation during hot, humid summer conditions. It is also desirable to have a vapor barrier that can become vapor permeable under humid conditions in the wall cavity caused by unexpected uncontrolled events like water leaks into the wall cavity, to facilitate drying of the wall cavity by inward moisture flow as well as outward flow. Under conditions of low ambient humidity, low moisture permeance is desirable and under high ambient humidity, high moisture permeance is desirable.

Besides having desirable vapor diffusion properties, a vapor barrier article also requires having other properties to form in the conditions in the roof. The vapor diffusion properties should remain stable in long duration over the usage conditions. Thus an article should be thermally stable, and have good mechanical properties and anti-static properties. The material is also preferred to be environmentally safe, such as not emitting toxic gas in the event of fire. The material should be compatible with other materials, especially with those of which other layers of a multilayer structure are made. This relates to the ease of preparation of the article, the mechanical integrity of the article, and associated cost.

U.S. Pat. Nos. 6,808,772; 6,878,455; 6,890,666 and 7,008,890 disclose applications of a polyamide building liner material that has a water vapor diffusion resistance (WVDR) of from 2 to 5 meters diffusion-equivalent air space width at a relative humidity (RH) of an atmosphere surrounding the vapor barrier between 30% and 50% and a WVDR of less than 1 meter diffusion-equivalent air space width at a relative humidity between 60% and 80%. See also US Patent Application Publication 2003/0215609 (a moisture-adaptive vapor-barrier film comprising PE and acrylic ester with a WVDR of from 0.5 to 100 meters diffusion-equivalent air space width at an RH of an atmosphere surrounding the vapor barrier between 60% and 80%) and U.S. Pat. Nos. 7,442,659 and 7,914,634 (use of ionomers for sealing insulating materials having a WVDR of from 1 to 20 meters diffusion-equivalent air space width at an RH of an atmosphere surrounding the vapor barrier of 25% and a WVDR of from 0.02 to 0.7 meter diffusion-equivalent air space width at a relative humidity of 72.5%).

U.S. Pat. No. 7,829,197 discloses a film or sheet comprising a neutralized acid copolymer or ionomer thereof, an organic acid, and optionally other polymers, having a ratio of wet cup permeance to dry cup permeance greater than 10. U.S. Pat. No. 7,838,104 discloses a multilayer film or sheet which comprises at least one vapor barrier layer and at least one vapor transmission-adjusting layer wherein the vapor transmission-adjusting layer comprises a neutralized acid copolymer or ionomer thereof, an organic acid, and optionally other polymers, having a ratio of wet cup permeance to dry cup permeance greater than 10.

There is a continuing need for a new material with vapor diffusion properties that can be tailored to meet varied building requirement in varied geographical conditions.

SUMMARY OF THE INVENTION

This invention provides a building article containing a layer of vapor permeable composition comprising or consisting essentially of (a) a copolymer comprising copolymerized units of ethylene and copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer, wherein the amine-reactive site is present in the copolymer in an amount of from 3 to 25 weight %; and (b) a short chain polymer having from about 5 to 50 repeat units and containing one primary amine active amine site, the remainder of the side chain polymer being substantially unreactive with the amine-reactive sites of the copolymer of (a) and comprising propylene oxide, ethylene oxide, or mixture thereof, in an amount of about 20 to about 50 parts by weight per 100 parts by weight of (a).

In a particular aspect the combination of (a) and (b) in the composition comprises an ethylene graft copolymer comprising polyetherimide segments, wherein the ethylene graft copolymer comprises, consists essentially of, or is produced from, a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one side chain polymer linked to said reactive sites through imide linkages, said side chain polymer being derived from a short chain polymer having from about 5 to 50 repeat units and containing one primary amine active amine site, the remainder of the side chain polymer being substantially unreactive with the amine-reactive sites of the trunk copolymer and comprising propylene oxide, ethylene oxide, or mixture thereof.

The selectively permeable composition may further comprise (c) an additional polymer present in an amount of about 10 to about 50 weight % of the combination of (a), (b) and (c), comprising or consisting essentially of polyethylene homopolymers, polyethylene copolymers, polypropylene homopolymers or polypropylene copolymers; or at least one ethylene copolymer comprising copolymerized units of ethylene and copolymerized units of a polar comonomer selected from vinyl acetate, alkyl methacrylate, alkyl acrylate, carbon monoxide or mixtures thereof, wherein said polar comonomer is present in the copolymer in an amount from about 6 to about 40 weight %.

Notably, the composition has a moisture vapor permeation value (MVPV) of at least 200 g-mil/m$^2$/24 h and high water-entry pressure; and the selectively permeable structure has a moisture vapor transmission rate (MVTR) of at least 30 g/m$^2$/24 h. The MVPV and MVTR are measured at 37.8° C. and 100% relative humidity according to ASTM F-1249.

Notably, the vapor permeable composition is combined with a substrate. The substrate is coextruded, impregnated, incorporated, laminated, embedded or coated with the composition of the vapor permeable composition. The vapor permeable composition is a monolithic or continuous membrane and the substrate is porous film, flash spun nonwoven fabrics or woven fabric. The nonwoven fabric may comprise polyethylene, polypropylene, polyester or combinations thereof, and woven fabrics may include synthetic fiber, natural fiber, or combinations of two or more thereof.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a range begins with 0, the component described by that range is an optional component and may or may not be present. When present, the amount of the component may be from 0.1 to the upper limit of the range.

When the term "about" is used in describing a value or an end-point of a range, the disclosure should be understood to include the specific value or end-point referred to.

Use of "a" or "an" are employed to describe elements and components of the invention. This is done merely for convenience and to give a general sense of the invention. This description should be read to include one or at least one and the singular also includes the plural unless it is obvious that it is meant otherwise.

"Consisting essentially of" means that the recited components are essential, while smaller amounts of other components may be present to the extent that they do not detract from the operability of the present invention.

The term copolymer takes on its ordinary meaning, that is, a polymer obtained by the copolymerization of two or more different monomers. The term "dipolymer" is a copolymer comprising, consisting essentially of or consisting of only two different monomers, and "terpolymer" is a copolymer comprising, consisting essentially of or consisting of only three different monomers.

The term "trunk copolymer" as employed herein includes the polymerization product of at least one polymerizable monomer that has no amine-active sites, e.g., ethylene, and at least one polymerizable monomer that provides amine-active sites, e.g., maleic anhydride, and optionally additional comonomers such as vinyl acetate, alkyl acrylate, alkyl methacrylate, etc.

The terms "short chain polymer," "side chain polymer" or "side chain oligomer" as employed herein include the polymerization products of a polymerizable monomer which contains one active amine site per chain. The active amine site can be attached to the amine-active sites of the trunk copolymer and is generally on one end of the side chain polymer while the other ends or substituent groups of the side chain polymer are substantially unreactive with the reactive sites of the trunk copolymer. The extent to which there may be more than one reactive site per chain is determined by the degree of crosslinking obtained in a specific case; i.e., the amount of additional reactive sites per chain, over one per chain, must be so small that the graft copolymer is not substantially cross-linked.

As used herein, the term "(meth)acrylic acid" shall be shorthand notation which shall be taken to mean compositions comprising methacrylic acid and/or acrylic acid. Likewise, the term "(meth)acrylate" shall be shorthand notation which shall be taken to mean compositions comprising methacrylate and/or acrylate.

Thermoplastic compositions are polymeric materials that can flow when heated under pressure. Melt index (MI) is the mass rate of flow of a polymer composition through a specified capillary under controlled conditions of temperature and pressure. Melt indices reported herein are determined according to ASTM 1238 at 190° C. using a 2160 g weight, with values of MI reported in grams/10 minutes.

Many previous permeable membranes are microporous; that is, they are permeable due to the presence of microscopic pores through which vapor can pass. The composition disclosed herein can be formed into a monolithic membrane that functions as a selectively permeable barrier. Monolithic membranes, in contrast to microporous membranes, have high water-entry pressure and are waterproof and liquid-proof and can provide good barriers to liquid water while still allowing permeability to water vapor under appropriate conditions. Monolithic membranes are also excellent in stopping draft flow to help minimize heat loss. A monolithic membrane can also function as a barrier to odors and possess tear strength compared to microporous membranes.

Permeance is a measure of the permeability of a material to water vapor divided by its thickness in inches and can be expressed in units of Perms (grains/h·ft$^2$·inches of Hg). The permeance of still air is 120 perms·inch (see Table 5.4, Page 158, *Thermal and Moisture Protection Manual*, Christine Beall, McGraw-Hill). Another measure of permeability is WVDR ($S_d$), which can be expressed in meters diffusion-equivalent air layer thickness. These measures can be related by the expression 3.048/$S_d$=Permeance in Perms.

For illustration, the diffusion resistance expressed as $S_d$ of prior vapor barrier materials has been converted to permeance expressed in Perms and summarized below:

| Reference | | Permeance (Perms) |
|---|---|---|
| U.S. Pat. No. 6,808,772 | 0.61 to 1.52 at 30 to 50% RH | Greater than 3.1 at 60 to 80% RH |
| US2003/0215609 | — | 0.03 to 6.09 at 60 to 80% RH |
| U.S. Pat. No. 7,442,659 | 0.15 to 3 at 25% RH | 4.35 to 152 at 72.5% RH |

Average humidity below 50% is thought of as relatively dry conditions and average humidity above 60% is thought of as relatively humid conditions.

The selectively permeable composition may have MVPV of at least 200, at least 800, at least 900, at least 1200, at least 2000, at least 4,000 g-mil/m$^2$/24 h, or even higher. MVPV is an indicator of the inherent permeability of the composition, by measuring moisture permeation of a membrane comprising the composition, which may be a film or sheet that is normalized to 1 mil thickness.

Selectively permeable protective articles may have MVTR of at least 30, at least 50, at least 100, at least 500, or at least 1000 g/m$^2$/24 h, or even higher. MVTR measures total moisture vapor transmitted through an article across its smallest dimension during a unit time, disregarding the structure thickness. For a membrane of a given composition and MVPV, MVTR decreases as the thickness increases.

A selectively permeable article of this invention provides a combination of mechanical properties, low temperature flexibility, selective transport, ease of processability, and cost-effectiveness. In one embodiment, this invention is an article that comprises a composition that has selectively permeable properties. Articles such as blown films prepared from blends of polyolefin and graft copolymers comprising an ethylene and a dicarboxylic monomer grafted with polyetheramine exhibit moisture permeation that correlates to the amount of polyetheramine content. The blends showed excellent temperature resistance as reflected from high melting point and high heat of fusion above 90° C. and also showed the capability to be sealed by thermal or high frequency welding or sealing. The blends are soft and highly flexible with excellent mechanical properties. The blends exhibit high adhesion (bonding) to polyethylene or polypropylene substrates for producing final products such as laminates of the composition to films, nonwoven textiles, etc. The preparation of permeable protective structures is straightforward and versatile.

The compositions of this invention comprise a copolymer containing a comononer that provides an amine-reactive site selected from the group consisting of an anhydride group, a vicinal pair of carboxylic groups and a carboxylic group adjacent to an alkoxycarbonyl group that is not present in the first polar copolymer. This copolymer is obtained by copolymerization of at least ethylene and at least one comonomer capable of copolymerizing with ethylene such as an anhydride or a functional equivalent thereof, such as a vicinal pair of carboxylic groups or a carboxylic group adjacent to an alkoxycarbonyl group, wherein the alkoxy group contains up to 20 carbon atoms and the comonomer provides an amine-reactive site in the copolymer. The comonomer includes $C_4$-$C_8$ unsaturated anhydrides, $C_4$-$C_8$ unsaturated acids having at least two carboxylic groups, monoesters or diesters of $C_4$-$C_8$ unsaturated acids having at least two carboxylic groups, and mixtures thereof.

Examples of suitable comonomers include unsaturated anhydrides such as maleic anhydride, and itaconic anhydride; 1,4-butenedioic acids (e.g. maleic acid, fumaric acid, itaconic acid and citraconic acid); and $C_1$-$C_{20}$ alkyl monoesters of the 1,4-butenedioic acids, including methyl hydrogen maleate, ethyl hydrogen maleate, propyl hydrogen fumarate, and 2-ethylhexyl hydrogen fumarate. Of these, maleic anhydride, ethyl hydrogen maleate and methyl hydrogen maleate are preferred. Maleic anhydride and ethyl hydrogen maleate (EHM) are most preferred.

Preferred are copolymers of ethylene and monoalkyl maleates (also known as alkyl hydrogen maleates). As used herein, the term "ethylene/monoalkyl maleate copolymers" refers to such copolymers prepared from ethylene and a maleic acid monoester (sometimes referred to as a "half-ester, wherein one carboxyl group of the maleic moiety is esterified and the other is an unesterified carboxylic acid).

Terpolymers or tetrapolymers comprise comonomers in addition to the ethylene and amine-reactive comonomer. Preferably, the additional comonomers are less reactive to amines than the amine-reactive site comonomer. The copolymers include E/X/Y terpolymers, wherein E is ethylene; X is a monomer selected from the group consisting of vinyl acetate, and alkyl (meth)acrylates; and Y is a maleic acid monoester, including maleic monoesters of $C_1$ to $C_4$ alcohols, such as for example, methyl, ethyl, n-propyl, isopropyl, and n-butyl alcohols, wherein X is less than 15 weight %, and preferably less than 5 weight % of the terpolymer. Examples of monomers suitable for inclusion as component X are (meth)acrylic acid esters of $C_1$ to $C_4$ alcohols. For example, suitable acrylate esters include methyl acrylate and butyl acrylate and suitable alkyl methacrylate esters include methyl methacrylate and n-butyl methacrylate. Preferably, when the copolymer is a higher order polymer such as a terpolymer, the combined comonomers other than ethylene are present in about 6 to about 30 weight % of the copolymer. For such copolymers, the alcohol moiety used in the maleic acid monoester comonomer may be the same as that used in the alkyl (meth)acrylate comonomer, or it may be different.

Specific examples of the copolymer include ethylene/maleic acid monoester dipolymers such as ethylene/ethyl hydrogen maleate dipolymer, ethylene/maleic acid monoester/methyl acrylate terpolymers, ethylene/maleic acid monoester/methyl methacrylate terpolymers, ethylene/maleic acid monoester/ethyl acrylate terpolymers, ethylene/maleic acid monoester/ethyl methacrylate terpolymers, ethylene/maleic acid monoester/n-butyl acrylate terpolymers and ethylene/maleic acid monoester/n-butyl methacrylate terpolymers.

Of particular note are ethylene/alkyl hydrogen maleate copolymers wherein the alkyl group is ethyl.

The copolymer may comprise about 6 to about 25 weight % copolymerized units of the amine-reactive comonomer, based on the weight of the copolymer. Alternatively, the level of copolymerized units of the amine-reactive comonomer (for example ethyl hydrogen maleate) is from a lower limit of about 6, 8 or about 10 weight % to an upper limit of about 18, about 20, or about 25 weight based on the total weight of the copolymer.

The copolymer may have a melt index from about 5 to about 400 g/10 min., preferably about 5 or about 10 to about 100 g/min. A representative copolymer is a random copolymer having a melt index of about 5 to 100 grams/10 minutes and consisting essentially of copolymerized ethylene and a monoalkyl ester of a 1,4-butenedioic acid in which the alkyl group of the ester has 1 to 4 carbon atoms. Preferably, the trunk copolymer is a dipolymer of ethylene and about 4 to about 25 weight %, or more preferably about 8 to about 20 weight %) of ethyl hydrogen maleate (an "EMAME" copolymer). A specific polymer may comprise from about 8 to about 10 weight % of ethyl hydrogen maleate. Another specific copolymer comprises about 15 weight % of ethyl hydrogen maleate. Such copolymers are commercially available from DuPont under the tradename Fusabond®.

Ethylene/ethyl hydrogen maleate/alkyl ester terpolymers are also known. For example, a terpolymer of 46.4% ethylene, 50% methyl acylate and 3.6% of monoethyl maleate is described in U.S. Pat. No. 3,972,961. Preferably, the amount of MAME in the copolymer is from about 6 to about 20 weight % and the amount of additional comonomer (vinyl acetate, alkyl acrylate or alkyl methacrylate is less than or equal to 15 or less than or equal to 6 weight % of the terpolymer.

Preferably the EMAME copolymer or the EMAME terpolymer has a melting point higher than 80° C.

These copolymers may be synthesized by random copolymerization of ethylene and the particular comonomer(s) in a high-pressure free radical process, generally an autoclave process. For example, ethylene/monoalkyl maleate copolymers can be obtained using a suitable high-pressure process described, for example, in U.S. Pat. No. 4,351,931, the teachings therein incorporated herein by reference. Some examples of this type of ethylene/ester copolymer are described in U.S. Patent Application Publication 2005/0187315.

Short Chain Polymers

The composition also comprises short chain polymers or oligomers having about 5 to 50 repeat units with one reactive end group comprising a primary amine, and the other end and/or substituent groups are substantially unreactive. Polyetheramines suitable for use as the short chain oligomer or polymer contain primary amino groups at the end of a polyether backbone. Examples of short chain polymers include polymers of organic oxides containing 2 to 16 carbon atoms, e.g., ethylene oxide, propylene oxide, 1,2-butylene epoxide, 1,4-butylene epoxide, styrene oxide, 1,2-diphenyl ethylene oxide, dioxolane, and copolymers of said organic oxides containing 2 to 16 carbon atoms, with a primary amine at one end. The average molecular weight ($M_W$) of the polyetheramine is in the range of 300 to 5000, preferably 500 to 3000.

Polyetheramines based on propylene oxide, ethylene oxide, or a mixture of both, are available commercially from Huntsman Chemical under the tradename Jeffamine®. Examples include Jeffamine® M-600 ($M_W$ approximately 600, 9/1 PO/EO ratio), Jeffamine® M-1000 ($M_W$ approximately 1000, 3/19 PO/EO ratio), Jeffamine M-2005 ($M_W$ approximately 2000, 29/6 PO/EO ratio) and Jeffamine M-2070 ($M_W$ approximately 2000, 10/31 PO/EO ratio).

The base resin polymer(s), the copolymer with amine-reactive sites and the short chain copolymer can be combined as a physical blend such as a salt and pepper pellet blend for further thermoplastic processing.

The short chain polymers can be linked to the amine-reactive sites of the copolymer of (b) to provide thermoplastic graft copolymers via the amine end as described in greater detail below.

Thermoplastic graft copolymers described herein are prepared by treating a trunk copolymer having amine-reactive sites with at least one side chain polymer having about one active primary amine site; the other groups or ends of the side chain polymer are substantially unreactive with the reactive sites on the trunk copolymer. In the final graft copolymer the trunk copolymer content ranges in an amount of about 25 to 95 weight % and the side chain polymer content ranges from about 5 to 75 weight %. The trunk copolymers contain, on a number average, about 300 to 50,000, preferably 500 to 20,000, chain atoms, and a number of amine reactive sites occurring, on the average, at a frequency of about one to 200 per 1000 chain atoms of the trunk copolymer. On the average there will be at least one active site per trunk copolymer chain. The side chain polymer will in general be shorter than the trunk copolymer, ranging in length from about 25 to 1,000 chain atoms, preferably about 30 to 300 chain atoms.

The trunk copolymers must be sufficiently stable to withstand heating during subsequent grafting of the side chain polymer. They should also be free from hydroxyl, primary amino, and secondary amino groups that can react with the amine-reactive sites to form thermostable crosslinks, which would cause a loss of the desired thermoplasticity.

The thermoplastic graft copolymer consists essentially of a trunk copolymer and a side chain polymer or oligomer wherein the trunk copolymer and the side chain polymer are preferably linked through imide linkages. The vicinal carboxylic acid groups allow formation of an imide when treated with the primary amine of the side chain polymer. When the trunk polymer is a terpolymer with an additional comonomer such as an alkyl acrylate or methacrylate, the primary amine of the side chain polymer may, depending on reaction conditions, alternatively/additionally react with the ester to provide an amide linkage.

The graft copolymers can be prepared in various ways. Convenient ways include (1) the anhydride route, for use with ethylene/maleic anhydride and other anhydride-containing trunk copolymers, and (2) the vicinal acid-acid or acid-ester route, for use with trunk copolymers having diacid or monoester of vicinal dicarboxylic acid substituents, respectively.

The anhydride route involves simply heating together with mixing the trunk copolymer having carboxylic anhydride groups, preferably maleic anhydride, and the amino-containing side chain polymer in the molten state, at a temperature from 75 to 250° C., such as about 225° C., or in solution at a temperature of 75 to 100° C. or higher. The heating temperature is above the melting point of the trunk copolymer and the amino polymer. The time of reaction, which is dependent upon the temperature and rate of mixing, can vary from about 15 seconds to 60 minutes in the melt, preferably 1 to 10 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. Completeness of reaction can be judged by the appearance of the product, good clarity in the melt indicating essentially complete reaction. With a roll mill as the reactor, the trunk copolymer and side-chain polymer can be premixed or mixed during reaction on the mill; and because of the exposure it may be desirable to include stabilizing agents such as inhibitors or antioxidants, or to carry out the operation in a protective atmosphere such as nitrogen. With an extruder as the reactor, premixing as a dry blend is desirable.

The vicinal acid-ester route can also be carried in the melt for reaction times similar to, but generally slower than, those for the anhydride route described above. The vicinal acid-ester route may be conducted in the same way as that described above for the anhydride route, carried out on a roll mill or in an extruder. Reaction between the polyetheramine and an EMAME copolymer proceeds well to high conversion, if the polar polyetheramine is effectively mixed with the non-polar EMAME for reaction.

The graft copolymer is believed to be obtained by attachment of the amine side chain to the backbone copolymer through imide linkages (with elimination of alcohol) which may be derived through intermediate formation of amic acids, or by prior conversion of the vicinal acid-ester by loss of alcohol to an anhydride and reaction of the latter with the amino oligomer as described above. The graft copolymer product can be characterized by several techniques, which show the presence of imide-linked side chains, the degree of polymerization of the side chains, and the chemical identity of the side chains, to name a few. Certain physical characteristics often are also helpful to show that a graft copolymer has been obtained.

Additional details of the reactions linking the trunk copolymer and the side chain polymer and means of characterizing the graft copolymer may be found in U.S. Pat. Nos. 3,972,961 and RE 30,754.

The process allows for control of the type and length of the polymer side chain grafted onto the trunk copolymer. From the specific type of trunk copolymer the average frequency of possible reactive graft sites can be readily determined by the fraction, e.g., on a molar basis, of monomer molecules providing the reactive sites which are polymerized into the trunk copolymer. Since the polymeric side chains are preformed prior to reacting with reactive sites on the trunk copolymer excellent control of the graft copolymer is achieved. The resultant thermoplastic graft copolymer is relatively uncontaminated with ungrafted side chain polymer, which may be a major problem in conventional free radical graft polymerization.

Incorporation of up to 20 weight % of Jeffamine M-600 or 35 weight % of Jeffamine M-1000 into an EMAME copolymer may be possible. The amount of possible polyetheramine incorporation increases for an EMAME copolymer with higher MAME content. An average of at least about three polyether segments grafted onto each EMAME polymer backbone is preferable.

Notably, the ethylene graft copolymer has a ratio of the mole % of polyetheramine added divided by the mole % of the comonomer providing an amine-reactive site in the starting trunk copolymer of about 0.1 to about 0.9, or from about 0.2 to about 0.8, or from about 0.3 to about 0.7.

The graft copolymer based on the reaction of EMAME and polyetheramine may have the ratio of the weight of polyetheramine added divided by the molecular weight of the polyetheramine versus the weight % of MAME in the starting EMAME copolymer divided by 144 of about 0.1 to about 0.9. For example, for 100 grams of EMAME (10 weight % of MAME), polyetheramine with a MW of 1000 would be incorporated into the polymer in the range of 6.9 grams to 62.5 grams. A preferred range is 0.2 to 0.8.

The advantage of this process in providing control of the side chain polymers is illustrated as follows. To provide improved properties at elevated temperatures, it may be desirable to have the side chain polymers of sufficient length so that these side chains can crystallize. For another use, it may be important that the side chain is not long enough to provide a substantial amount of crystallization at room temperature.

The graft copolymer can be prepared and then blended with an optional polymer resin described below by standard blending procedures. Blending in the melt can conveniently be carried out on a roll mill, in a melt extruder, or in internal mixers having convoluted rollers, sigma blades, etc.

Preferably, the grafting of the side chain polymer to the trunk polymer and the blending with the optional resin can be conducted in a single operation, provided the optional resin does not react with the side chain polymer. Notably, the method comprises (1) providing a trunk copolymer as described above; (2) providing a short chain polymer as described above; (3) providing an optional resin as described below; and (4) heating and mixing for about 15 seconds to 60 minutes the trunk polymer, the short chain polymer and the optional polymer, to provide a blend of the ethylene graft copolymer comprising polyetherimide segments and the optional polymer.

The blending and grafting may be conducted using a roll mill, in a melt extruder, or in internal mixers having convoluted rollers, sigma blades, etc, preferably using an extruder. For example, pellets of the base resin, trunk polymer and side chain polymer may be pre-blended to provide a salt-and-pepper blend of the three components and then melt blended in an extruder. During the extrusion, the trunk polymer and the side chain polymer can react to form the graft copolymer. Alternatively, the components may be fed from separate hoppers into the extruder to be blended and grafted.

The selectively permeable composition may further comprise an optional polymer resin that may include polyethylene homopolymers, polyethylene copolymers, polypropylene homopolymers or polypropylene copolymers. Including polyolefins such as polyethylene and/or polypropylene may provide balanced properties such as including polyethylene or polypropylene, which may provide lower cost and/or improved adhesion to low polarity materials without significantly reducing the moisture permeability properties of the blend. Inclusion of polypropylene may also provide for higher usage temperatures.

"Polyethylene" includes low density polyethylene, linear low density polyethylene, high density polyethylene or metallocene polyethylene. An ethylene-based polymer suitable as a polymeric material that can be used as the surface layer can be an ethylene homopolymer or a copolymer of ethylene and α-olefin having three or more (preferably from 3 to 12) carbon atoms that is manufactured in the presence of a metallocene catalyst (see for example U.S. Pat. Nos. 5,198,401 and 5,405,922).

Examples of the α-olefin having three or more carbon atoms in the aforementioned ethylene copolymer include propylene, 1-butene, 1-pentene, 1-hexene, 1-octene, 1-decene, 1-dodecene, 4-methyl-1-pentene, etc. In particular, a copolymer of ethylene and an α-olefin having from 3 to 12 carbon atoms is preferably used. In some cases, more than one α-olefin may be present in a mixture that can be copolymerized with ethylene.

As the polymer or copolymer of ethylene manufactured in the presence of a metallocene catalyst, those with various densities may be employed depending upon the α-olefin content in the copolymer. In general, however, it is preferable to use an ethylene copolymer having a density of from about 870 to about 970 kg/m$^3$, particularly from about 890 to about 950 kg/m$^3$, and especially from about 900 to about 940 kg/m$^3$. When processability and practical physical properties are taken into consideration, preferred is the use of a polymer having a melt flow rate, measured at 190° C. and 2160 g load, of from about 0.1 to about 100 g/10 minutes, preferably from about 0.2 to about 50 g/10 minutes.

Polar Ethylene Copolymers

Compositions of this invention may comprise an additional resin that may include at least one copolymer obtained from copolymerization of ethylene with a polar monomer (that is, a polar ethylene copolymer). Inclusion of polar ethylene copolymers may provide improved improved adhesion to polar materials. The optional polymer(s) can be present in amounts up to about 69 weight % of the base resin of, so long as they do not detract from the basic and novel characteristics of the composition and do not significantly adversely affect the desirable performance characteristics, such as moisture permeability, high temperature resistance, adhesive properties or optical clarity of the composition.

Preferably, the ethylene copolymer comprises ethylene/vinyl acetate copolymers, ethylene/alkyl (meth)acrylate copolymers and ethylene/(meth)acrylate/carbon monoxide terpolymers and/or mixtures of any of these. Ethylene (meth)acrylate copolymers include ethylene acrylic ester copolymers and ethylene methacrylic ester copolymers.

Combinations of two or more different polar ethylene copolymers may be suitable. For example, combinations of two or more polar ethylene copolymers with different polar comonomers can be suitable, as can be combinations of two or more polar ethylene copolymers having identical monomers but with different amounts of said monomers.

Ethylene/Vinyl Acetate Copolymers

A composition of this invention may comprise at least one ethylene/vinyl acetate copolymer (an EVA copolymer), or blends thereof.

The weight percentage of vinyl acetate monomer incorporated into an EVA copolymer suitable for use herein can vary from about 2 weight percent up to about 45 weight percent or greater, based on the total weight of the copolymer. The amount of vinyl acetate can be varied to obtain a desirable degree of polarity sought for the blended composition.

The ethylene/vinyl acetate copolymer preferably has a vinyl acetate unit content of from about 6 to about 40% by weight, or from a lower limit of about 6, about 12, or about 15 weight % to an upper limit of about 20, or about 30 or about 40 weight %. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the compositions for this invention in place of a single copolymer as long as the average values for the comonomer content will be within the range indicated above. Particularly useful properties may be obtained when two or more properly selected ethylene/vinyl acetate copolymers are used in blends of this invention.

Ethylene/Alkyl Acrylate Copolymers

As used herein, ethylene/alkyl (meth)acrylate copolymers include copolymers of ethylene and alkyl acrylates or alkyl methacrylates wherein the alkyl moiety contains from one to 20, preferably one to six carbon atoms. Examples of alkyl acrylates include methyl acrylate, ethyl acrylate and butyl acrylate and examples of alkyl methacrylates include methyl methacrylate, ethyl methacrylate and butyl methacrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl (meth)acrylate comonomer incorporated into ethylene/alkyl (meth)acrylate copolymer can, in principle, vary broadly from a few weight percent up to as high as 40 weight percent of the total copolymer or even higher, such as from about 6 to about 40% by weight, or from a lower limit of about 6, about 12, or about 15 weight % to an upper limit of about 20, or about 30 or about 40 weight %. Similarly, the alkyl group can comprise from 1-carbon to 6-carbon groups, that is to say the alkyl group can vary from a methyl group up to and inclusive of branched and/or unbranched propyl, butyl, pentyl, and hexyl groups. The relative amount and choice of the alkyl group present in the alkyl (meth)acrylate ester comonomer can be used to manipulate the polarity of the composition. Preferably, the alkyl group in the alkyl (meth)acrylate comonomer has from one to four carbon atoms.

The ethylene/alkyl (meth)acrylate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes. Of note is an ethylene/methyl acrylate copolymer comprising 20 weight % methyl acrylate with an MI of 8 g/10 min.

Ethylene/alkyl (meth)acrylate copolymers can be prepared by processes well known in the polymer art using either autoclave or tubular reactors. The copolymerization can be run as a continuous process in a stirred high-temperature and high-pressure autoclave reactor. For example, ethylene, the alkyl acrylate, and optionally a solvent such as methanol (U.S. Pat. No. 5,028,674) are fed continuously into a stirred autoclave such as the type disclosed in U.S. Pat. No. 2,897,183, together with an initiator.

Preferably, the ethylene copolymer is of the type that is prepared in a high pressure, tubular reactor according to the procedure described in the article "High Flexibility EMA Made from High Pressure Tubular Process" (Annual Technical Conference—Society of Plastics Engineers (2002), 60th (Vol. 2), 1832-1836). The ethylene copolymer is obtained in a tubular reactor at elevated temperature with additional introduction of reactant comonomer along the tube. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756, 996; and 5,532,066, and as such these high melting point materials should be considered equivalent for purposes of this invention.

Ethylene/alkyl acrylate copolymers suitable for use in this invention include those available from DuPont under the Elvaloy® AC tradename.

Mixtures of two or more ethylene/alkyl (meth)acrylate copolymers are contemplated as within the scope of this invention.

The selectively permeable composition may further comprise an optional polymer resin that may include polyethylene homopolymers, polyethylene copolymers, polypropylene homopolymers or polypropylene copolymers. Including polyolefins such as polyethylene and/or polypropylene may provide balanced properties such as including polyethylene or polypropylene, which may provide lower cost and/or improved adhesion to low polarity materials without significantly reducing the moisture permeability properties of the blend. Inclusion of polypropylene may also provide for higher usage temperatures.

"Polyethylene" includes low density polyethylene, linear low density polyethylene, high density polyethylene or metallocene polyethylene. An ethylene-based polymer suitable as a polymeric material that can be used as the surface layer can be an ethylene homopolymer or a copolymer of ethylene and α-olefin having three or more (preferably from 3 to 12) carbon atoms that is manufactured in the presence of a metallocene catalyst (see for example U.S. Pat. Nos. 5,198,401 and 5,405,922).

Examples of the α-olefin having three or more carbon atoms in the aforementioned ethylene copolymer include propylene, 1-butene, 1-pentene, 1-hexene, 1-octene, 1-decene, 1-dodecene, 4-methyl-1-pentene, etc. In particular, a copolymer of ethylene and an α-olefin having from 3 to 12 carbon atoms is preferably used. In some cases, more than one α-olefin may be present in a mixture that can be copolymerized with ethylene.

As the polymer or copolymer of ethylene manufactured in the presence of a metallocene catalyst, those with various densities may be employed depending upon the α-olefin content in the copolymer. In general, however, it is preferable to use an ethylene copolymer having a density of from about 870 to about 970 kg/m$^3$, particularly from about 890 to about 950 kg/m$^3$, and especially from about 900 to about 940 kg/m$^3$. When processability and practical physical properties are taken into consideration, preferred is the use of a polymer having a melt flow rate, measured at 190° C. and 2160 g load, of from about 0.1 to about 100 g/10 minutes, preferably from about 0.2 to about 50 g/10 minutes.

Polar Ethylene Copolymers

Compositions of this invention may comprise an additional resin that may include at least one copolymer obtained from copolymerization of ethylene with a polar monomer (that is, a polar ethylene copolymer). Inclusion of polar ethylene copolymers may provide improved improved adhesion to polar materials. The optional polymer(s) can be present in amounts up to about 69 weight % of the base resin of, so long as they do not detract from the basic and novel characteristics of the composition and do not significantly adversely affect the desirable performance characteristics, such as high temperature resistance, adhesive properties or optical clarity of the composition.

Preferably, the ethylene copolymer comprises ethylene/vinyl acetate copolymers, ethylene/alkyl (meth)acrylate copolymers and ethylene/(meth)acrylate/carbon monoxide terpolymers and/or mixtures of any of these. Ethylene (meth)acrylate copolymers include ethylene acrylic ester copolymers and ethylene methacrylic ester copolymers.

Combinations of two or more different polar ethylene copolymers may be suitable. For example, combinations of two or more polar ethylene copolymers with different polar comonomers can be suitable, as can be combinations of two or more polar ethylene copolymers having identical monomers but with different amounts of said monomers.

Ethylene/Vinyl Acetate Copolymers

A composition of this invention may comprise at least one ethylene/vinyl acetate copolymer (an EVA copolymer), or blends thereof.

The weight percentage of vinyl acetate monomer incorporated into an EVA copolymer suitable for use herein can vary from about 2 weight percent up to about 45 weight percent or greater, based on the total weight of the copolymer. The amount of vinyl acetate can be varied to obtain a desirable degree of polarity sought for the blended composition.

The ethylene/vinyl acetate copolymer preferably has a vinyl acetate unit content of from about 6 to about 40% by weight, or from a lower limit of about 6, about 12, or about 15 weight % to an upper limit of about 20, or about 30 or about 40 weight %. The ethylene/vinyl acetate copolymer may optionally be modified by methods well known in the art, including modification with an unsaturated carboxylic acid or its derivatives, such as maleic anhydride or maleic acid. The ethylene/vinyl acetate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes.

Ethylene/vinyl acetate copolymers suitable for use in this invention include those available from E. I. du Pont de Nemours & Co. (DuPont), Wilmington, Del. under the Elvax® tradename.

A mixture of two or more different ethylene/vinyl acetate copolymers can be used in the compositions for this invention in place of a single copolymer as long as the average values for the comonomer content will be within the range indicated above. Particularly useful properties may be obtained when two or more properly selected ethylene/vinyl acetate copolymers are used in blends of this invention.

Ethylene/Alkyl Acrylate Copolymers

As used herein, ethylene/alkyl (meth)acrylate copolymers include copolymers of ethylene and alkyl acrylates or alkyl methacrylates wherein the alkyl moiety contains from one to 20, preferably one to six carbon atoms. Examples of alkyl acrylates include methyl acrylate, ethyl acrylate and butyl acrylate and examples of alkyl methacrylates include methyl methacrylate, ethyl methacrylate and butyl methacrylate. "Ethylene/methyl acrylate" (EMA) means a copolymer of ethylene and methyl acrylate. "Ethylene/ethyl acrylate" (EEA) means a copolymer of ethylene and ethyl acrylate. "Ethylene/butyl acrylate" (EBA) means a copolymer of ethylene and butylacrylate. Of note are ethylene/butyl acrylate copolymers prepared from i-butyl acrylate comonomers (EiBA) and ethylene/butyl acrylate copolymers prepared from n-butyl acrylate comonomers (EnBA).

The relative amount of the alkyl (meth)acrylate comonomer incorporated into ethylene/alkyl (meth)acrylate copolymer can, in principle, vary broadly from a few weight percent up to as high as 40 weight percent of the total copolymer or even higher, such as from about 6 to about 40% by weight, or from a lower limit of about 6, about 12, or about 15 weight % to an upper limit of about 20, or about 30 or about 40 weight %. Similarly, the alkyl group can comprise from 1-carbon to 6-carbon groups, that is to say the alkyl group can vary from a methyl group up to and inclusive of branched and/or unbranched propyl, butyl, pentyl, and hexyl groups. The relative amount and choice of the alkyl group present in the alkyl (meth)acrylate ester comonomer can be used to manipulate the polarity of the composition. Preferably, the alkyl group in the alkyl (meth) acrylate comonomer has from one to four carbon atoms.

The ethylene/alkyl (meth)acrylate copolymer preferably has a melt index, measured in accordance with ASTM D 1238 at 190° C., of from about 1 to about 800 g/10 minutes or from about 1 to about 400 g/10 minutes, more preferably from about 1 to about 100 g/10 minutes. Of note is an ethylene/methyl acrylate copolymer comprising 20 weight % methyl acrylate with an MI of 8 g/10 min.

Ethylene/alkyl (meth)acrylate copolymers can be prepared by processes well known in the polymer art using either autoclave or tubular reactors. The copolymerization can be run as a continuous process in a stirred high-temperature and high-pressure autoclave reactor. For example, ethylene, the alkyl acrylate, and optionally a solvent such as methanol (U.S. Pat. No. 5,028,674) are fed continuously into a stirred autoclave such as the type disclosed in U.S. Pat. No. 2,897,183, together with an initiator.

Preferably, the ethylene copolymer is of the type that is prepared in a high pressure, tubular reactor according to the procedure described in the article "High Flexibility EMA Made from High Pressure Tubular Process" (Annual Technical Conference—Society of Plastics Engineers (2002), 60th (Vol. 2), 1832-1836). The ethylene copolymer is obtained in a tubular reactor at elevated temperature with additional introduction of reactant comonomer along the tube. However, it should be appreciated that similar ethylene/alkyl acrylate copolymeric material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

Ethylene/alkyl acrylate copolymers suitable for use in this invention include those available from DuPont under the Elvaloy® AC tradename.

Mixtures of two or more ethylene/alkyl (meth)acrylate copolymers are contemplated as within the scope of this invention.

The composition can additionally comprise small amounts of additives commonly used and well known in the adhesive art including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. These additives are described in the Kirk Othmer *Encyclopedia of Chemical Technology*.

These additives may be present in the compositions in quantities ranging from 0.01 to 15, 0.01 to 10, or 0.01 to 5, weight %. The incorporation of the additives can be carried out by any known process such as, for example, by dry blending, by extruding a mixture of the various constituents, by the conventional masterbatch technique, or the like.

The composition can further comprise a fire retardant such as a chemical additive including, but not limited to, phosphorous compounds, antimony oxides, and halogen compounds, particularly bromine compounds, and others well known in the art. A loading of such additives can be between 20 to 30, or about 25% (of the final air-dried composition or air-dried film weight).

The composition may also comprise fillers, fibers, or pulps in added quantities that may be up to 30 to 40 weight % of the total composition. These materials may provide reinforcement or otherwise modify the mechanical properties of the composition, without negatively impacting the selective permeability of the composition. Fillers include, for example, inorganic materials such as carbon black, $TiO_2$, calcium carbonate ($CaCO_3$). Fibers, including chopped fibers, include glass fibers, aramid fibers, carbon fibers and the like. Pulps include, for example aramid micropulps (micropulp has a volume average length from about 0.01 to about 100 micro-meters).

Of note are compositions that do not comprise or include low weight-average molecular weight copolyester such as described in WO2002/102898 and US2003/0021945.

The composition as described herein has a permeance (water vapor diffusion) that is dependent on the ambient humidity, allowing it to be used to prepare a variable vapor barrier. The variable vapor barrier can also be termed a "humidity-adaptive smart vapor barrier."

Compositions of this invention have moisture vapor transmission as measured by water vapor permeation values (WVPV) above 200 g-mil/m$^2$-24 h, and may have WVPV above 1000, above 5000, or above 10,000 g-mil/m$^2$-24 h when measured at 100% relative humidity. For some applications, such as variable vapor barriers for moisture control in buildings, it may be desirable to have higher WVPV.

In another embodiment, the composition may be applied to a substrate comprising a carrier material. For example, the composition may be applied as a coating or a laminate to the carrier material. Alternatively, a film comprising the variable vapor barrier composition may be laminated to a substrate of the carrier material. Substrate can be any materials providing support, shape, esthetic effect, protection, surface texture, bulk volume, weight, or combinations of two or more thereof to enhance the functionality and handability of variable vapor barrier composition.

For example, the composition, either in the form of a film or combined with a substrate, can be applied to a wall, ceiling or roof of a building between the interior sheathing material (such as gypsum wallboard) and the insulation. Articles comprising the composition and a substrate can be used to provide structural components that can be used in the construction or renovation of a building. The variable vapor barrier composition may be used as a surface for building panels or as a backing sheet for insulation. Also, films and structures prepared from the composition have sufficient strength and toughness for use in buildings as they are being built or renovated. When used as part of a building, the variable vapor barrier can be applied between the interior sheathing and the insulating material in a wall, ceiling and/or roof of a building in accordance with the invention. It can also be used with metal roofs or timber post constructions and can also lead to a reduction in building costs along with an improvement in moisture and temperature control.

The humidity-dependent behavior of the variable vapor barrier leads to a lower permeance being achieved under cold, dry exterior conditions than under hot humid exterior conditions. In this way, the variable vapor barrier material is effective in preventing moisture from diffusing from the interior of the building into the wall cavity and condensing into liquid water under winter conditions. Under conditions of high exterior humidity, the humidity-dependent behavior of the material provides moisture flow out of the wall cavity in either directions (particularly into the air-conditioned interior of the building) when needed, to facilitate a drying out process and to avoid water condensation in the wall cavity due to cooling by the building air conditioning. This behavior fosters peak insulation performance and reduces the risk of damage to building components due to excess moisture retention.

In one embodiment according to the invention, the variable vapor barrier is a film that can be applied as part of the wall, ceiling or roof construction of a building. For example, the film may be attached to the framing members so that the film is between the insulating material and the interior sheathing.

In another embodiment according to the invention, the variable vapor barrier is part of a structural component of the house that has a carrier material for the variable vapor barrier composition.

Cellulose materials such as paper webs (for example Kraft paper), membranes made from synthetic fiber spun fabrics such as nonwoven textiles such as Tyvek® nonwoven fabric, or even perforated films having large percentages of open areas such as perforated PE films, may be used as materials for the carrier(s), for example. These carrier materials may be reinforced with fibers. Other examples of suitable carrier materials for purposes of the present invention include particle board, chip board, oriented strand board, plywood paneling, gypsum board (standard or fiber reinforced), fiber board, cement board, cementitious wood wool board, calcium silica board, fiber insulation batts or slabs, foam insulation slabs, cloth, or combinations of two or more thereof. The variable vapor barrier itself may be applied to any of these carrier materials as a film or membrane or as a coating (via extrusion coating, spraying, painting or other appropriate application methods).

Of note is a variable vapor barrier wherein at least one layer of carrier material is thermal insulation selected from the group consisting of fiber insulation batts, fiber insulation slabs, foam insulation slabs, or combinations of two or more thereof. The at least one layer can also be gypsum board, a cellulose material such as Kraft paper, a nonwoven textile, or combinations of two or more thereof.

For example, the variable vapor barrier material is applied to a carrier material as a film, a coating or a laminated layer. The coating or laminate can be applied to one side or both sides of the carrier material but, in special cases it can also be accommodated between two layers of the carrier material in a sandwich-like manner. In the latter embodiment, the coating or laminate material is effectively protected from both sides from mechanical wear and it can therefore ensure the desired water vapor diffusion properties over an extended period of time. To avoid hindering drying, the carrier of these embodiments is such that the carrier material has a water vapor diffusion that is greater than the water vapor diffusion of the variable vapor barrier material so that the water vapor diffusion characteristics of the structure are essentially provided by the variable vapor barrier material. Several such layer assemblies can also be assembled one above the other.

In the case where the carrier material is coated or laminated on one side, this coating or laminate can be applied to the side on which little or no protection is required against mechanical influences. The installation of the variable vapor barrier in accordance with the invention can take place in such a way in this case that the protective carrier material points toward the side facing the room.

Of note is an embodiment wherein the variable vapor barrier material is applied to a paper web or a nonwoven textile web by, for example but not limitation, extrusion coating. For example, extrusion coating the variable vapor barrier material onto paper can be done as follows: dried granulates of the blend (and granulates of compositions for other layers, if present) are melted in single screw extruder(s). The molten polymer(s) are passed through a flat die to form a molten polymer curtain wherein the compositions of the individual layers are present in a laminar flow. The molten curtain drops onto the moving paper or nonwoven textile substrate to be immediately pressed into that substrate and quenched by a quench drum.

A film of the variable vapor barrier material can also be laminated to a paper web or a nonwoven textile web by means of an inner layer applied in molten form to adhere the film to the substrate. The process involves laying down a molten curtain of the inner layer composition between the film and the substrate moving at high speeds as they come into contact with a cold (chill) roll. The melt curtain is formed by extruding the inner layer composition through a flat die.

Use of paper or nonwoven textile coated with the variable vapor barrier material is particularly advantageous for production of building materials in continuous processes wherein the coated paper or nonwoven is supplied as a continuous web and is incorporated as part of a multilayer structure. An example embodiment further comprises insulation batts or slabs, wherein the paper or nonwoven coated with the variable vapor barrier is a facing sheet for the insulation. In another embodiment, the coated paper or nonwoven can be applied as a backing sheet for a building panel comprising, for example but not limitation, particle board, chip board, oriented strand board, plywood paneling, gypsum board (standard or fiber reinforced), fiber board, cement board, cementitious wood wool board, or calcium silica board.

These embodiments allow for the installation of the variable vapor barrier and an additional building material, such as insulation or a building panel, in a single operation. In an alternative embodiment, a fiberglass batt may be encased in an envelope prepared from a variable vapor barrier film of this invention. This embodiment also allows for the installation of insulation and the variable vapor barrier, such as in between the framing members in a wall cavity, in a single operation.

EXAMPLES

Without further elaboration, it is believed that one skilled in the art using the preceding description can utilize this invention to its fullest extent. The following Examples are, therefore, to be construed as merely illustrative, and not limiting of the disclosure in any way whatsoever. The methods for the evaluation of the raw materials used and the performances of the resulting laminates in the following Examples and Comparative Examples are shown below.

Materials Used

PEA-1: a monoamine-terminated polyether with a MW of 1000 and mole ratio between PO and EO of 3/19 obtained from Huntsman as Jeffamine® M-1000.

EMAME-1: a copolymer of 90.5 weight % ethylene and 9.5 weight % MAME, with MI of 30 as measured at 190° C.

EMAME-2: a copolymer of 85 weight % ethylene and 15 weight % MAME, with MI of 40 as measured at 190° C.

EVA-1: a copolymer of ethylene and 25 weight % of vinyl acetate, with MI of 2 as measured at 190° C.

EMA-1: a copolymer of ethylene and 20 weight % of methyl acrylate, with MI of 8 as measured at 190° C.

AOX-1: an antioxidant commercially available from CIBA-Geigy under the tradename Irganox® 1010.

AOX-2: an antioxidant commercially available from CIBA-Geigy under the tradename Irganox® 1098.

LDPE is a low-density polyethylene, available from Alathon under the designation 1640.

Sample Preparation

All samples were made on a 26-mm twin-screw extruder, typically with 180-200° C. barrel temperature settings and screw speed of 100 rpm. Polymers, including EMAME-1 or EMAME-2 and optional polymers EMA-1 and LDPE when used, with an antioxidant, were fed at the back end of the extruder, followed by an intense kneading section in the extruder screw to disperse these ingredients. PEA-1, in liquid form was injected into the extruder barrel through a Katron pump with temperature setting at 50° C. after the initial mixing section, and this liquid injection was followed by additional intense mixing elements. The melt strand from the extruder was water quenched and cut into pellets for collection and subsequent evaluation.

Table 2 summarizes the materials prepared by melt blending the components listed as parts by weight. Examples 1 to 8 are blends of EMAME copolymers containing varied amounts of PEA-1 to form graft copolymers.

Table 2 lists two blend examples. Example 9 is a blend of EMAME and EMA-1 (70/30 weight %) with 28 weight % of PEA-1. Antioxidant AOX-1, 0.1 weight %, was included. The sample was produced in a W/P extruder in one step. Example 10 is a blend of 40 weight % of LDPE and 60 weight % of a polyethyleneamine-grafted EMAME. The grafted component of Example 10 was prepared from 100 parts by weight of EMAME-2 and 40 parts by weight of PEA 2 and AOX-2, 0.1 wt. %, prepared separately in a W/P extruder. The graft copolymer had a melting point of 100.7° C. In essence, Example 10 was prepared in two steps by first making the polyetheramine-grafted E/MAME and then blending with LDPE.

To illustrate moisture permeance associated with a film layer, blown films were prepared from the materials listed in Table 2. All samples were made into blown films easily. The films, approximately 1 to 3 mils in thickness, were made using a small laboratory scale blown film line.

Two-layer laminates of Tyvek® HomeWrap and selected blown films were prepared by press molded at 120° C. The MVTR of the laminates are reported in Table 1.

The materials were characterized by the following methods.

Melt Index and Melting Point

Melt index (MI) is the mass rate of flow of a polymer through a specified capillary under controlled conditions of temperature and pressure. It was measured according to ASTM 1238 using a 2160 gram weight at 190° C.

Melting points of the samples were measured using a differential scanning calorimetry (DSC). All samples showed a melting point at about 103 to 108° C. Thus, the samples all have good temperature resistance, which is important when the materials are to be used as a roof membrane.

Moisture Vapor Permeation Values and Moisture Vapor Transmission Rate

The water vapor transmission tests were conducted on a Mocon PERMATRAN-W 101K, following ASTM D6701-01, at 37.8° C. at 100% relative humidity. Moisture vapor permeation values (MVPV) on single layer film samples are reported in g-mil/m$^2$-24 h while MVTR on laminates are reported in g/m$^2$-24 h.

Adhesion to Nonwoven Substrate

The blown films were sandwiched between Tyvek® HomeWrap and press molded at 120° C. A T-peel test was performed to determine whether the blown film adhered to the Tyvek®. In all sandwich samples, the Tyvek® was pulled apart into fuzz and threads, which suggested excellent adhesion of the blown film to Tyvek®.

In the Table, "NA" stands for "not available."

The MVPV data of the "dry" blown films are included in Table 2. The compositions all had MVPV of greater than 1000 g-mil/m$^2$/24 h.

The MVPR data of the blown films after water treatment are also included. The films were immersed in water at room temperature for 48 hours, and then the wet films were air dried.

In comparison between the MVPV of the "dry" control and the water treated film, there was little difference noticed. This suggests that the moisture permeation of the films is quite stable after RH % variation.

Wet Cup MVTR Testing

The blown film of 60 micrometers thickness of Example 9 was further tested in a Wet Cup method designed for VCL roofing membranes (15% RH on one side and 85% on other side) according to Method EN ISO 12572. The film has a moisture transmission rate of 638 g/m2/day, which meets the requirements of breathable Vapor Control Layer membranes in Europe.

TABLE 1

| | 1 | 2 | 3 | 4 | 5 | 6 | 7 | 8 | 9 | 10 |
|---|---|---|---|---|---|---|---|---|---|---|
| | | | | | Parts by weight | | | | | |
| EMAME-1 | | | | | 100 | 100 | 100 | 100 | 70 | 43 |
| EMAME-2 | 100 | 100 | 100 | 100 | | | | | | |
| EMA-1 | | | | | | | | | 30 | |
| LDPE | | | | | | | | | | 40 |
| PEA-1 | 30 | 35 | 40 | 45 | 30 | 35 | 40 | 24.5 | 28 | 17 |
| AOX-1 | 0.1 | 0.1 | 0.1 | 0.1 | 0.1 | 0.1 | 0.1 | 0.1 | 0.1 | |
| AOX-2 | | | | | | | | | | 0.06 |
| Melt Flow Index | 5.9 | 4.3 | 4.7 | 5.3 | 4.5 | 4.2 | 4.2 | 6.7 | 4.0 | 5.0 |
| DSC Melting point (° C.) | 104 | 103 | 103.6 | 103.4 | 106.4 | 105.7 | 106.2 | 108 | 102.5 | 108 |
| | | | | | Blown Film | | | | | |
| Thickness (mil) | 1 | 2.3 | 2.3 | 1.85 | 1.8 | 1.8 | 2.4 | 2.3 | 2.0 | 2.2 |
| | | | | | MVPV (g-mil/m$^2$-24 h) | | | | | |
| dry | 1490 | 3472 | 3018 | 3763 | 2270 | 2732 | 4097 | 2945 | 1865 | 1510 |
| dry | 1705 | 3116 | 2953 | 3863 | 2290 | 3096 | 4506 | 2729 | | |

TABLE 1-continued

| | Parts by weight | | | | | | | | | |
|---|---|---|---|---|---|---|---|---|---|---|
| | 1 | 2 | 3 | 4 | 5 | 6 | 7 | 8 | 9 | 10 |
| water treated | 1383 | 2775 | 3610 | 3610 | 1853 | 2560 | 3523 | 2203 | | |
| water treated | 1342 | 2560 | 3845 | 3532 | 2010 | 2586 | 3835 | 2160 | | |
| adhesion to Tyvek® | excellent | excellent | excellent | excellent | excellent | excellent | excellent | excellent | excellent | NA |
| Two-layer laminate of the blown film and Tyvek® | | | | | | | | | | |
| Thickness (mil) | NA | 6.2 | NA | 4.9 | NA | 5.6 | NA | NA | 5.8 | NA |
| MVTR (g/m²-24 h) | NA | 432 | NA | 937 | NA | 875 | NA | NA | 722 | NA |

The invention claimed is:

1. A building article comprising a layer of a vapor permeable composition comprising
   (a) a copolymer comprising copolymerized units of ethylene and monoalkyl maleates providing an amine-reactive site comprising an anhydride group, a vicinal pair of carboxylic groups, or a carboxylic group adjacent to an alkoxycarbonyl group, wherein the alkoxycarbonyl group contains up to 20 carbon atoms, and optionally copolymerized units of a third comonomer, wherein the amine-reactive site is present in the copolymer in an amount of from 3 to 25 weight %; and
   (b) a short chain polymer having from about 5 to 50 repeat units and containing one primary amine active amine site, the remainder of the short chain polymer being substantially unreactive with the amine-reactive sites of the copolymer of (a) and comprising propylene oxide, ethylene oxide, or mixtures thereof, in an amount of about 20 to about 50 parts by weight per 100 parts by weight of (a); wherein the short chain polymer is a polyetheramine and the vapor permeable composition comprises a ratio of a mole % of the polyetheramine in the vapor permeable composition divided by a mole % of the monoalkyl maleate in the copolymer of from 0.1 to 0.9; and
a substrate wherein the substrate or a portion thereof is coextruded, impregnated, incorporated, laminated, embedded, or coated with the vapor permeable composition.

2. The building article of claim 1 wherein the vapor permeable composition comprises an ethylene graft copolymer comprising polyetherimide segments, wherein the ethylene graft copolymer comprises: a trunk copolymer comprising copolymerized units of ethylene, copolymerized units of a comonomer providing an amine-reactive site comprising an anhydride group, a vicinal pair of carboxylic groups or a carboxylic group adjacent to an alkoxycarbonyl group, wherein the alkoxy group contains up to 20 carbon atoms, and optionally copolymerized units of a third comonomer; and at least one type side chain polymer linked to said reactive sites through imide linkages, said side chain polymer being derived from the short chain polymer having from about 5 to 50 repeat units and containing one primary amine active amine site, the remainder of the short chain polymer being substantially unreactive with the amine-reactive sites of the trunk copolymer and comprising propylene oxide, ethylene oxide, or mixtures thereof.

3. The building article of claim 1 wherein the vapor permeable composition further comprises: (c) an additional polymer present in an amount of about 10 to about 50 weight % of the combination of (a), (b), and (c), the additional polymer comprising polyethylene homopolymers, polyethylene copolymers, polypropylene homopolymers, or polypropylene copolymers; or at least one ethylene copolymer comprising copolymerized units of ethylene and copolymerized units of a polar comonomer selected from vinyl acetate, alkyl methacrylate, alkyl acrylate, carbon monoxide, or mixtures thereof, wherein said polar comonomer is present in the copolymer in an amount from about 6 to about 40 weight %.

4. The building article of claim 1 wherein the article is selectively permeable to moisture and has a moisture vapor transmission rate, measured according to ASTM F2298, of at least 1000 g/m²/24 h.

5. The building article claim 1 wherein the layer of the vapor permeable composition is a film.

6. The building article of claim 5 wherein the substrate comprises a carrier material and the vapor permeable composition is applied to the substrate.

7. The building article of claim 5 wherein the vapor permeable composition is a monolithic or continuous membrane and the substrate is paper, porous film, flashspun nonwoven fabric, or woven fabric.

8. The building article of claim 5 wherein the substrate is a nonwoven fabric comprising polyethylene, polypropylene, polyester, or combinations thereof.

9. The building article of claim 5 wherein the substrate comprises a woven fabric that includes synthetic fiber, natural fiber, or combinations thereof.

10. The building article of claim 5 wherein the substrate is a film and the vapor permeable composition is applied as a coating or a laminate to the substrate.

11. The building article of claim 5 wherein the film comprising the vapor permeable composition is laminated to the substrate.

12. The building article of claim 11 wherein the substrate is paper.

13. The building article of claim 12 further comprising insulation batts or slabs, wherein the paper is a facing sheet for the insulation batts or slabs.

14. The building article of claim 12 wherein the paper is a backing sheet for a building panel comprising particle board, chip board, oriented strand board, plywood paneling, gypsum board, fiber board, cement board, cementitious wood wool board, calcium silica board, or combinations of two or more thereof.

15. The building article of claim 6 further comprising particle board, chip board, oriented strand board, plywood paneling, gypsum board (standard or fiber reinforced), fiber board, cement board, cementitious wood wool board, or calcium silica board.

16. The building article of claim 6 further comprising insulation batts or slabs.

17. A method for constructing a new building or renovating an existing building comprising applying the building article according to claim 1 to a wall, ceiling, or roof of a building between the interior sheathing material and the insulation.

18. A building member comprising the building article according to claim 1, wherein the building member is a wall, ceiling, floor, or roof.

\* \* \* \* \*